United States Patent [19]

Biale

[11] Patent Number: 5,173,534
[45] Date of Patent: Dec. 22, 1992

[54] EMULSION AND LATEX PAINT CONTAINING MULTIPURPOSE BINDER

[75] Inventor: John Biale, Anaheim, Calif.

[73] Assignee: Rohm and Haas Company, Philadelphia, Pa.

[21] Appl. No.: 722,360

[22] Filed: Jun. 19, 1991

Related U.S. Application Data

[63] Continuation of Ser. No. 303,805, Jan. 30, 1989.

[51] Int. Cl.$^5$ ............................................. C08L 33/00
[52] U.S. Cl. ...................................... 524/555; 524/813
[58] Field of Search ................. 524/555, 813; 522/301

[56] References Cited

U.S. PATENT DOCUMENTS

| | | | |
|---|---|---|---|
| 2,606,892 | 8/1952 | Kropa et al. | 260/80.3 |
| 2,718,516 | 9/1955 | Bortnick | 260/86.1 |
| 2,727,020 | 12/1955 | Melamed et al. | 260/80.3 |
| 2,821,544 | 1/1958 | Holtschmidt | 260/486 |
| 2,882,259 | 4/1959 | Graham | 260/45.5 |
| 3,290,350 | 12/1966 | Hoover | 260/453 |
| 3,299,007 | 1/1967 | Suling et al. | 260/77.5 |
| 3,453,223 | 7/1969 | Suling et al. | 260/17 |
| 4,222,909 | 9/1980 | Brixius et al. | 260/18 TN |
| 4,251,421 | 2/1981 | Hertler | 260/31.2 |
| 4,264,748 | 4/1981 | Oriel et al. | 525/109 |
| 4,273,690 | 6/1981 | Walus | 260/22 CB |
| 4,320,221 | 3/1982 | Hoffman | 528/69 |
| 4,514,552 | 4/1985 | Shay et al. | 524/813 |
| 4,608,314 | 8/1986 | Turpin et al. | 526/301 |
| 4,624,762 | 11/1986 | Abbey et al. | 524/507 |

OTHER PUBLICATIONS

Chen, T. J., "Preparation and Polymerization of New Dual Active Functional Monomers," *Polymeric Materials Science and Engineering*, vol. 56, American Chemical Society Spring Meeting 1987, Denver, Colorado.

Dexter, Robin W., et al., "m-TMI, A Novel Unsaturated Aliphatic Isocyanate", Reprint from June 1986 issue of *Journal of Coatings Technology*, vol. 58, No. 787, pp. 43-47.

Dexter, Robin W., et al., "m-TMI, A Novel Unsaturated Aliphatic Isocyanate", *Polymeric Materials Science and Engineering*, vol. 53, American Chemical Society Fall Meeting 1985, Chicago, Illinois.

Shay, G. D., et al., "Urethane-Functional Alkali-Soluble Associative Latex Thickeners," *Journal of Coatings Technology*, vol. 58, No. 732, Jan. 1986, pp. 43-53.

Theodore, A. N., et al., "A Convenient Preparation of Acrylic-Urethane Nonaqueous Dispersions," *Journal of Coatings Technology*, vol. 57, No. 721, Feb. 1985, pp. 67-71.

Thomas, Mary R., "Isocyanatoethyl Methacrylate: A Heterofunctional Monomer for Polyurethane and Vinyl Polymer Systems," *Journal of Coatings Technology*, vol. 55, No. 703, Aug. 1983, pp. 55-61.

"m-TMI Bifunctional Monomer," Cyanamid Polymer Chemicals Department.

"TMI-A Bifunctional Monomer," Cyanamid.

Saxon et al., *Cellular Polymers*, 4:117-149 (1985).

*Primary Examiner*—Joseph L. Schofer
*Assistant Examiner*—Jeffrey T. Smith

[57] ABSTRACT

Monomers of formula I

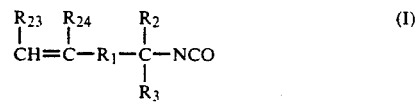

and/or monomers of formula II

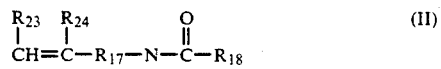

are used to make an emulsion for use in a latex paint. $R_1$ is a divalent organic radical, $R_2$ and $R_3$ are each independently selected from the group consisting of monovalent alkyl radicals containing up to about 7 carbon atoms, $R_{17}$ is a divalent organic radical, $R_{18}$ is a monovalent organic radical having an HLB value of about 17 to about 19, $R_{23}$ is selected from the group consisting of hydrogen and alkyl radicals containing up to about 5 carbon atoms, and $R_{24}$ is selected from the group consisting of hydrogen, halogen, and alkyl radicals containing up to abut 5 carbon atoms. The resulting latex paint exhibits either improved flow leveling and/or film-build.

15 Claims, No Drawings

EMULSION AND LATEX PAINT CONTAINING MULTIPURPOSE BINDER

This application is a continuation of application Ser. No. 07/303,805, filed Jan. 30, 1989.

BACKGROUND

The present invention relates to polymeric emulsions and latex paints.

Latex paints are a mixture of a multitude of ingredients. Typical ingredients include coalescing aids, thickening aids, dispersing aids, defoamers, biocides, pigments, and binders. The large number of ingredients makes it difficult to formulate latex paints. In addition, optional ingredients are also employed in latex patent formulations to enhance various paint properties. For example, rheology modifiers are employed to enhance a paint's flow and leveling and film-build characteristics. Flow and leveling is an indication of a paint's ability to form a smooth surface devoid of brush marks upon application of the paint to a surface. Film build is an indication of a paint's hiding power, i.e., an indication of how well one coat of the paint covers a surface. Since flat latex paints are generally applied over a much larger surface area, e.g., wall and ceiling surfaces, than the surface areas typically covered by semi-gloss latex paints, e.g., trim, film build characteristics are especially important to flat latex paints.

The use of these optional ingredients in paint formulations not only tends to make it more difficult to formulate latex paints but also may adversely affect other latex paint properties.

SUMMARY OF THE INVENTION

The present invention provides a latex paint capable of exhibiting enhanced flow and leveling and/or film-build properties without the use of a rheology modifier. The latex paint is formed by combining a coalescing aid, a thickening aid, a dispersing aid, a defoamer, a biocide, a pigment, and an emulsion. The emulsion, comprising water and a substantially water-insoluble, polymeric binder, is formed by reacting a plurality of monomers. In one embodiment of the invention, at least one of the monomers has the formula I

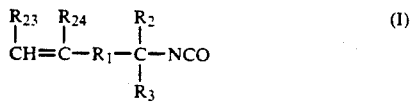

wherein $R_1$ is a divalent organic radical, $R_2$ and $R_3$ are each independently selected from the group consisting of monovalent alkyl radicals containing up to about 7 carbon atoms, $R_{23}$ is selected from the group consisting of hydrogen and alkyl groups containing up to about 5 carbon atoms, and $R_{24}$ is selected from the group consisting of hydrogen, halogen, and alkyl groups containing up to about 5 carbon atoms. In another embodiment of the invention, at least one of the monomers employed in the emulsion forming reaction has the formula II

wherein $R_{17}$ is a divalent organic radical, $R_{18}$ is a monovalent organic radical having a hydrophile-lipophile balance (HLB) value of about 17 to about 19, and $R_{23}$ and $R_{24}$ are as defined above. Alternatively, the emulsion is formed by including at least one monomer of formula I and at least one monomer of formula II in the reaction. When the emulsion is prepared using monomers of formula I, the resulting latex paint exhibits improved flow and leveling. Latex paints incorporating an emulsion prepared using monomers of formula II exhibit improved film-build. Latex paints having enhanced film-build and flow and leveling characteristics can be obtained by incorporating an emulsion prepared with monomers of formulas I and II.

The invention also encompasses a composition formed by drying the latex paint as well as an article having at least a portion of its surface coated with the composition.

DETAILED DESCRIPTION OF THE INVENTION

The present invention is directed to (a) an emulsion comprising water and a substantially water-insoluble, polymeric binder, (b) a latex paint containing the emulsion, (c) a composition formed by drying the paint, and (d) a substrate having a surface at least partially coated with the composition.

In accordance with the present invention, the emulsion is formed by reacting a plurality of monomers. In one version of the invention, at least one of the monomers has the formula I

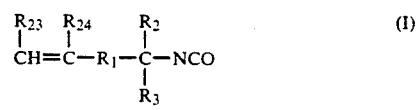

wherein $R_1$ is a divalent organic radical, $R_2$ and $R_3$ are each independently selected from the group consisting of monovalent alkyl radicals containing up to about 7 carbon atoms, $R_{23}$ is selected from the group consisting of hydrogen and alkyl groups containing up to about 5 carbon atoms, and $R_{24}$ is selected from the group consisting of hydrogen, halogen, and alkyl groups containing up to about 5 carbon atoms. As used in the specification and claims, the term "organic radical" means any group containing at least one carbon atom. Preferably, $R_2$ and $R_3$ are each independently selected from the group consisting of monovalent alkyl radicals containing up to about 4 carbon atoms. More preferably, $R_2$ and $R_3$ are each methyl. Generally, $R_1$ contains less than about 100 atoms and usually less than about 50 atoms. In one embodiment of the invention, $R_1$ has the formula $-O-R_4-$, wherein $R_4$ is an alkylene group containing up to about 7 carbon atoms. Preferably, $R_4$ contains up to about 4 carbon atoms and, more preferably, $R_4$ is methylene. In another embodiment of the invention, $R_1$ is a divalent aromatic radical. Generally, the divalent aromatic radical comprises up to about 10 carbon atoms. Preferably, the divalent aromatic radical contains up to about 7 carbon atoms, and more preferably is selected from the group consisting of phenylene and methylphenylene. Most preferably, $R_1$ is m-phenylene.

Monomers of formula I wherein $R_1$ is $-O-R_4-$ can be prepared according to the process described in U.S. Pat. No. 2,727,020, and monomers of formula I wherein $R_1$ is a divalent aromatic radical can be prepared according to the processes discussed in U.S. Pat. No.

3,290,350, the entire patents being incorporated herein by reference.

Generally, monomers of formula I comprise up to about 2 weight percent of the solid content of the emulsion. Preferably, monomers of formula I comprise from about 0.01 to about 1, and more preferably from about 0.1 to about 0.5, weight percent of the solid content of the emulsion.

In another version of the instant invention, at least one of the monomers employed in the emulsion forming reaction has the formula II

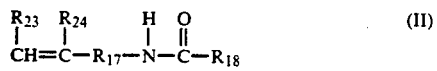
(II)

wherein $R_{17}$ is a divalent organic radical $R_{18}$ is a monovalent organic radical, typically having an HLB value of 17 to about 19, and $R_{23}$ and $R_{24}$ are as defined above. Generally, $R_{17}$ contains less than about 100 atoms, and usually less than about 60 atoms. In one embodiment of the invention, $R_{17}$ has the formula $-(R_{19})_n-(CH_2)-$, wherein $R_{19}$ is selected from the group consisting of substituted and unsubstituted divalent saturated aliphatic hydrocarbon radicals and divalent aromatic hydrocarbon radicals, and n is 0 or 1. Typically, $R_{19}$ contains from 1 to about 20 carbon atoms. Exemplary divalent, saturated aliphatic hydrocarbon radicals include alkylene radicals, preferably containing up to about 8 carbon atoms. The alkylene radicals can be cyclic, acyclic, or branched. Specific divalent saturated aliphatic hydrocarbon radicals include methylene, ethylene, propylene, butylene, isobutylene, pentylene, isopentylene, hexylene, cyclopentylene, cyclohexylene, and cycloheptylene. Exemplary divalent aromatic hydrocarbon radicals contain from 6 to about 12 carbon atoms. Typical divalent aromatic hydrocarbon radicals include phenylene, naphthylene, biphenylene, and benzylene. Exemplary substituents include methyl, ethyl, propyl, butyl, phenyl, naphthyl, tolyl, and benzyl.

In another embodiment of the invention, $R_{17}$ has the formula

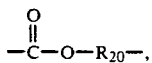

wherein $R_{20}$ is an alkylene group, preferably comprising up to about 14 carbon atoms. Alkylene groups can be cyclic, acyclic, and branched. Exemplary alkylene groups include ethylene, isopropylene, propylene, butylene, ethylethylene, dimethylethylene, 3-methyl-7-dimethylseptylene, 1,4-dimethylenecyclohexane, 1-methylene-cyclohexyl, and 2-phenyl-propylene.

In other embodiments of the invention, $R_{17}$ has either the formula $-O-R_4-$ or the formula

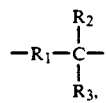

wherein $R_1$, $R_2$, $R_3$, and $R_4$ are as defined above.

With respect to $R_{18}$, $R_{18}$ generally contains less than about 1,000 atoms, and usually less than about 700 atoms. Preferably, $R_{18}$ has the formula $-R_{21}-R_{22}$ wherein $R_{21}$ is a hydrophilic divalent organic radical and $R_{22}$ is a monovalent hydrophobic organic radical. Exemplar $R_{21}$ radicals include $-(CH_2CH_2O)_p-$ and $-(\text{propylene oxide})_1-$, wherein p is an integer of about 40 to about 70, and q is an integer of about 20 to about 50. Preferably $R_{21}$ is ethylene oxide and p is an integer of about 45 to about 55, and more preferably about 50. Exemplar $R_{22}$ radicals include branched alkyl radicals and alkylphenyl radicals. Preferably, $R_{22}$ is an alkylphenyl radical whose alkyl group comprises about 5 to about 12 carbon atoms. More preferably, the alkyl group comprises about 8 to about 10 carbon atoms. The most preferred alkylphenyl radical is p-nonylphenyl In general, the monomers of formula II are prepared as shown in the following reaction:

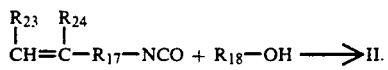

When $R_{18}$ is $-R_{21}-R_{22}$ and $R_{21}$ is ethylene oxide, the reaction can be schematically represented as follows:

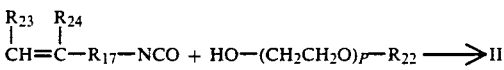

An exemplary protocol for the latter reaction is set forth in Shay et al., Journal of Coatings Technology, 58 (732): 43–53 (1986), the entire article being incorporated herein by reference.

When monomers of formula II are used to form the emulsion, the monomers of formula II typically comprise up to about 5 weight percent of the solid content of the emulsion. Preferably, the monomers of formula II comprise from about 0.5 to about 5 weight percent of the solid content of the emulsion.

In still another version of the invention, at least one monomer of formula I and at least one monomer of formula II are among the monomers reacted in forming the emulsion. In this version of the invention, the total concentration of formula I monomers and the total concentration of formula II monomers each independently comprises up to about 2 weight percent of the solid content of the emulsion. Preferably, the monomers of formula I comprise from about 0.01 to about 1 weight percent of the solid content of the emulsion and the monomers of formula II comprise from about 0.01 to about 2 weight percent of the solid content of the emulsion. More specifically, the monomers of formula I comprise from about 0.1 to about 0.5 weight percent of the solid content of the emulsion and the monomers of formula II comprise from about 0.5 to about 1 weight percent of the solid content of the emulsion.

When the monomer of formula I is used in formulating the emulsion, the binder present in the emulsion has at least one pendant group having the formula III

(III)

wherein $R_1$, $R_2$ and $R_3$ are as defined above. More specifically, the use of the formula I monomer in the emulsion forming reaction yields a binder whose backbone comprises at least one unit having the formula IV

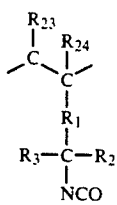

(IV)

wherein $R_1$, $R_2$, $R_3$, $R_{23}$, and $R_{24}$ are as defined above.

When monomers of formula II are used to form the emulsion, the binder present in the resulting emulsion has at least one pendant group having the formula V

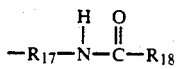

(V)

or, in some instances, at least one pendant group having a formula VI

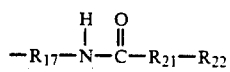

(VI)

wherein $R_{17}$, $R_{18}$, $R_{21}$, and $R_{22}$ are as defined above. More precisely, the use of the formula II monomer in the emulsion forming reaction yields a binder whose backbone comprises at least one unit having the formula VII

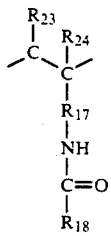

(VII)

or, in some instances, at least one unit having a formula VIII

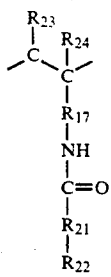

(VIII)

wherein $R_{17}$, $R_{18}$, $R_{21}$, $R_{22}$, $R_{23}$, and $R_{24}$ are as defined above.

Typically, the pendant group of formula III or unit of formula IV comprises up to about 2 weight percent of the binder. Preferably, the pendant group of formula III or unit of formula IV comprises about 0.01 to about 1, and more preferably, about 0.1 to about 0.5, weight percent of the binder. Typically, the pendant group of formula V or VI or unit of formula VII or VIII comprises up to about 5 weight percent of the binder. Preferably, the pendant group of formula V or VI or unit of formula VII or VIII comprises about 0.5 to about 5, and more preferably about 1 to about 4 weight percent of the binder. When monomers of formulas I and II are used in forming the emulsion, the binder present in the resulting emulsion has at least one pendant group of formula III or unit of formula IV and at least one pendant group of formula V or VI or unit of formula VII or VIII. In this latter embodiment, the pendant groups of formulas III and V or VI or units of formulas IV and VII or VIII each independently comprise up to about 2 weight percent of the binder. Preferably, the binder comprises from about 0.1 to about 1 weight percent of the pendant group of formula III or unit of formula IV and about 0.01 to about 2 weight percent of the pendant group of formula V or VI or unit of formula VII or VIII. More preferably, the binder comprises about 0.1 to about 0.5 weight percent of the pendant group of formula III or unit of formula IV and about 0.5 to about 1 weight percent of the pendant group of formula V or VI or unit of formula VII or VIII.

At least one additional monomer is employed in forming the emulsion. Exemplary additional monomers employed in the emulsion-forming reaction include, but are not limited to, alkyl esters of acrylic, alpha-haloacrylic, and methacrylic acids; vinyl esters of saturated carboxylic acids; alkenyl aromatics; alkadienes; and mixtures thereof. As a result of their participation in the emulsion forming reaction, these monomers are generally incorporated into the backbone of the binder. Exemplary alkyl esters include, but are not limited to, alkyl acrylates, preferably containing about 2 to about 12 carbon atoms in the alkyl moiety; alkyl methacrylates, preferably containing about 1 to about 12 carbon atoms in the alkyl moiety; and alkyl haloacrylates, preferably containing about 2 to about 12 carbon atoms in the alkyl moiety. Specific alkyl esters include, but are not limited to, methyl acrylate, ethyl acrylate, butyl acrylate, octyl acrylate, 2-ethyl hexyl acrylate, cyclo hexyl acrylate, methyl methacrylate, ethyl methacrylate, butyl methacrylate, hexyl methacrylate, 2-ethyl hexyl methacrylate, butyl chloroacrylate, and lauryl chloroacrylate.

Exemplary vinyl esters include, but are not limited to, vinyl acetate, vinyl propionate, vinyl butyrate, vinyl valerate, vinyl benzoate, and vinyl versatate.

Alkenyl aromatic monomers are any organic compound containing at least one aromatic ring and at least one aliphatic-containing moiety having alkenyl unsaturation. Preferred alkenyl aromatic monomers are represented by the formula IX

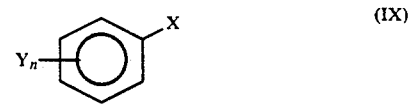

(IX)

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred alkenyl group substituents are halogen radicals, e.g., chloride. However, the alkenyl group is more preferably unsubstituted, i.e., a hydrocarbon, and contains only one olefinic unsaturation. Ethylene is the most preferred X.

Y is an organic or inorganic radical. As used throughout the specification and claims, the term "inorganic radical" means any group devoid of even one carbon atom. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary substituents for Y include halo and cyano radicals and substituted and unsubstituted alkyl radicals of 1 to about 10 carbon atoms. Preferred Y substituents are chloride and unsubstituted alkyl groups of 1 to about 6 carbon atoms. Y is most preferably a chloride radical and $C_1$ to about $C_4$ unsubstituted alkyl radicals.

Illustrative alkenyl aromatic monomers include styrene, p-methyl styrene, methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixtures thereof. Due to its commercial availability and low cost, styrene is the preferred alkenyl aromatic monomer.

An exemplary alkadiene monomer has the formula X

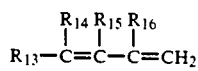

(X)

wherein $R_{13}$, $R_{14}$, $R_{15}$, and $R_{16}$ are each independently selected from the group consisting of hydrogen, halogen, and alkyl radicals, preferably containing 1 to about 2 carbon atoms. Commercially available alkadiene monomers include butediene, isoprene, 1,3-pentadiene, 2-ethyl butadiene, and 4-methyl-1,3-pentadiene. The preferred alkadiene monomer is butadiene.

A reactive monomer can optionally be present in the emulsion forming reaction. As used in the specification and claims, the term "reactive monomer" means a monomer that contains at least one group, e.g., hydroxyl, carboxyl, amide, and amine, that can undergo further reaction. Typical reactive monomers include hydroxyalkyl acrylates having the formula XI

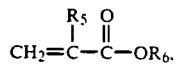

(XI)

olefinically unsaturated monomers having the formula XII

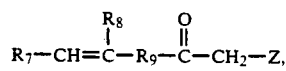

(XII)

acrylamide monomers having the formula XIII

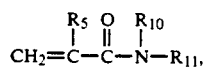

(XIII)

aminoalkyl acrylate monomers having the formula XIV

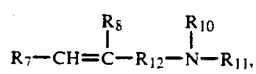

(XIV)

ureido-containing amines, and mixtures thereof. In formula XI, supra, $R_5$ is usually selected from the group consisting of hydrogen and alkyl, preferably $C_1$ to about $C_{10}$, and most preferably methyl, and $R_6$ is an hydroxyalkyl group, usually comprising up to about 6 carbon atoms. Preferred hydroxyalkyl groups comprise up to about 3 carbon atoms. Typical hydroxyalkyl acrylates include, but are not limited to, hydroxyethyl acrylate and hydroxyethyl methacrylate.

In formula XII, supra, $R_7$ is usually selected from the group consisting of hydrogen and halogen, $R_8$ is usually selected from the group consisting of hydrogen, halo, thio, and monovalent organic radicals, $R_9$ is a divalent organic or inorganic radical, and Z is usually selected from the group consisting of organoacyl and cyano. Generally, $R_8$ contains up to about 10 atoms other than hydrogen. Preferably, $R_7$ is hydrogen and $R_8$ is hydrogen or an alkyl radical having up to about 10 carbon atoms. $R_9$ can be or contain heteroatoms, such as oxygen, sulfur, phosphorus, and nitrogen. The heteroatoms are preferably selected from the group consisting of oxygen, sulfur, and nitrogen. In addition, $R_9$ can contain functional groups such as carbonyls, carboxy-esters, thio, and amino substituents. Although $R_9$ can also comprise aromatic, olefinic, or alkynyl unsaturated, $R_9$ is preferably saturated. Preferably, $R_9$ is a cyclic or acyclic organic radical containing up to about 40 carbon atoms. Most preferably, $R_9$ is an acyclic organic radical containing up to about 20 atoms in length, with any and all side groups each being up to about 6 atoms in length. Because of commercial availability, Z preferably is organoacyl. Z generally has the formula XV

(XV)

wherein $R_{25}$ is selected from the group consisting of hydrogen and monovalent organic radicals Typically, $R_{25}$ contains up to about 10 atoms in addition to any hydrogen atoms present in the monovalent organic radical. Preferably, $R_{25}$ is hydrogen or an alkyl group containing up to about 7 carbon atoms. Methyl is the most preferred $R_{25}$.

A preferred olefinically unsaturated functional nonionic monomer has the formula XVI

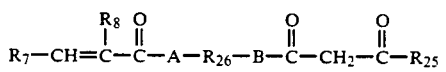

(XVI)

wherein $R_7$, $R_8$, and $R_{25}$ are as defined above, $R_{26}$ is a divalent organic radical at least 2 atoms in length, and A and B are each independently selected from the group consisting of O, S, and $NR_{27}$, with $R_{27}$ being selected from the group consisting of hydrogen and hydrocarbyl radicals containing up to about 6 carbon atoms. Preferably, $R_{27}$ is hydrogen or an alkyl group. Oxygen is preferred for A and B. Typically, $R_{26}$ contains up to about 40 atoms, but usually contains no more than about 20 atoms. $R_{26}$ can be cyclic or acyclic and contain both cyclic and acyclic moieties. Exemplary cyclic $R_{26}$ groups include cycloalkylenes and phenylene. However $R_{26}$ is preferably acyclic and is selected from the group consisting of substituted and unsubstituted alkylenes, polyoxyalkylenes, polythioalkylenes, and polyaminoalkylenes. Unsubstituted alkylenes are most preferred for $R_{26}$. Due to its commercial availability, a preferred olefinically unsaturated functional nonionic monomer of formula XVI is acetoacetoxyethyl methacrylate having the following formula XVII:

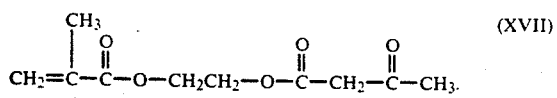

With respect to the acrylamide monomers of formula XIII, supra, $R_5$ is as discussed above and $R_{10}$ and $R_{11}$ are each independently selected from the group consisting of hydrogen and alkyl radicals containing up to about 2 carbon atoms. Preferred acrylamide monomers include acrylamide, methacrylamide, and mixtures thereof.

In the aminoalkyl acrylate monomers of formula XIV, supra, $R_7$, $R_8$, $R_{10}$, and $R_{11}$ are as discussed above, and $R_{12}$ is a divalent alkyl radical, preferably containing 1 to about 5 carbon atoms. An exemplary aminoalkyl acrylate is dimethylaminoethyl methacrylate.

An exemplary ureido-containing amine is 1-[2-(3-allyloxy-2-hydroxypropyl-amino)ethyl]imidazolidin-2-one, commercially known as Sipomer WAM brand monomer by Alcolac.

The binder generally has a $T_g$ of about $-10°$ to about $20°$ C. More typically, the binder has a $T_g$ of about $-5°$ to about $5°$ C. Usually, the binder is a copolymer whose constituent monomers are selected to achieve a $T_g$ within the above ranges. This is accomplished by selecting suitable hard and soft monomers. As used in the specification and claims, the term "hard monomers" means monomers capable of forming a homopolymer having a $T_g$ of at least about $10°$ C., and the term "soft monomers" means those monomers capable of forming a homopolymer having a $T_g$ of less than about $10°$ C.

Exemplary hard monomers include, but are not limited to, styrene, vinyl acetate, vinyl chloride, methyl methacrylate, ethyl methacrylate, butyl methacrylate, and isobutyl methacrylate. Preferred hard monomers are styrene, vinyl acetate, and methyl methacrylate.

Exemplary soft monomers include, but are not limited to, vinylidene chloride, butadiene, ethylene, methyl acrylate, ethyl acrylate, butyl acrylate, isobutyl acrylate, and 2-ethyl hexyl acrylate Preferred soft monomers are ethyl acrylate and 2-ethyl hexyl acrylate.

The emulsion is preferably prepared by either delay addition or pre-emulsion techniques. The delay addition technique comprises forming a charge by combining water and a surfactant. The surfactant is generally a copolymerizable surfactant, an anionic surfactant, a nonionic surfactant, or a mixture thereof. Exemplary copolymerizable surfactants include, but are not limited to, sulfoethyl methacrylate, vinyl sulfonate salts, sulfopropyl methacrylate, styrene sulfonate salts, and 2-acrylamido-2-methylpropanesulfonic acid salts. Generally, the copolymerizable surfactant comprises up to about 5 weight percent of the solid content of the resulting emulsion. More typically, the copolymerizable surfactant comprises about 0.1 to about 5 weight percent of the solid content of the resulting emulsion. When the copolymerizable surfactant is employed, it preferably comprises about 0.5 to about 2 weight percent of the solid content of the resulting emulsion. Anionic surfactants include, but are not limited to, alkylphenylethoxylate sulfates and sulfonates, alkylsulfates and sulfonates, and sulfosuccinates. Nonionic surfactants include, but are not limited to, alkylarylpolyether alcohols, alkylarylethoxylates, alkylethoxylates, and ethyleneoxide/propylene oxide block copolymers. The system optionally contains a protective colloid, e.g., hydroxyethyl cellulose, as a stabilizer.

The charge is added to a reactor. Preferably, the reactor is purged with an inert gas, such as nitrogen, to remove substantially all oxygen from the reactor. Next, a monomer mixture is prepared containing hard and soft monomers as well as at least one monomer of formula I and/or at least one monomer of formula II. A portion of the monomer mixture is added to the charge in the reactor to form a reaction medium. Usually, polymerization is initiated by heating the reactor contents to a temperature at least capable of initiating the polymerization reaction. Generally, the reactor is heated to at least about 50° F., but preferably, to at least about 100° F. To further aid in initiating the polymerization reaction, it is preferred to add an initiator and an activator to the reactor. Exemplary initiators include, but are not limited to, t-butyl hydroperoxide, sodium persulfate, hydrogen peroxide, and mixtures thereof. The preferred initiator is t-butyl hydroperoxide. Exemplary activators include, but are not limited to, sodium sulfoxylate formaldehyde, sodium bisulfide, sodium bisulfite, sodium metabisulfite, erythorbic acid, and mixtures thereof. The preferred activator is sodium sulfoxylate formaldehyde.

After initiating the polymerization reaction, the remaining portion of the monomer mixture is added to the reactor. The delay-added portion of the monomer mixture is preferably added to the reactor after the reactor has reached a temperature of at least about 120° F., preferably at least about 150° to about 155° F. After adding any delay-added monomer mixture, the reactor is maintained at about 150° to about 155° F. until substantially all the monomers have reacted. However, the temperature can be allowed to reach 180° F. It is also preferred that the addition of any delay-added monomer mixture be accompanied by the addition of a supplemental initiator and a supplemental activator. Exemplary supplemental initiators include, but are not limited to, sodium persulfate, hydrogen peroxide, t-butyl hydroperoxide, and mixtures thereof. A preferred supplemental initiator is sodium persulfate. Exemplary supplemental activators include, but are not limited to, sodium bisulfide, sodium bisulfite, sodium metabisulfite, erythorbic acid, sodium sulfoxylate formaldehyde, and mixtures thereof. A preferred supplemental activator is sodium bisulfite.

In the pre-emulsion technique, the emulsion is prepared by first preparing a pre-emulsion comprising water, a surfactant, hard monomers, soft monomers, and at least a monomer of formula I and/or at least one monomer of formula II. An initiator, an activator, and the pre-emulsion are simultaneously added to a reactor containing water. Prior to adding the pre-emulsion to the reactor, the reactor is preferably purged with an inert gas for the purpose described above.

Both the delay addition and pre-emulsion polymerization processes yield an emulsion comprising the binder and water. The emulsion is substantially devoid of any organic solvent, the emulsion being formed in a media consisting essentially of water. However, as indicated in the above described processes, the emulsion can further comprise a surfactant, initiators, and activators. Accordingly, the emulsion typically consists essentially of the binder, water, at least one surfactant, at least one initiator, and at least one activator. In other words, the emulsion typically consists essentially of the products of a reaction mixture that consists essentially of water, at least one monomer of formula I and/or at least one monomer of formula II, at least one additional monomer, at least one surfactant, at least one initiator, and at least one activator.

The emulsion is combined with a coalescing aid, thickening aid, a dispersing aid, a defoamer, a biocide, and a pigment to form a latex paint. Coalescing aids, thickening aids, dispersing aids, defoamers, biocides, and pigments suitable for use in latex paints are well known to those skilled in the art. Typically, the binder comprises about 15 to about 25 weight percent of the solid content of a semi-gloss latex paint and about 5 to about 15 weight percent of the solid content of a flat latex paint. The latex paint can be applied to at least a portion of a surface of a substrate.

When at least one monomer of formula I is employed in formulating the emulsion, a latex paint incorporating that emulsion tends to have enhanced flow and leveling characteristics. One flow and leveling indicator is a paint's relaxation response. An exemplary method for measuring relaxation response entails the use of a Wells-Brookfield Cone-Plate viscometer. The method consists of placing a sample (about 2 ml) of latex paint in the viscometer's vertically movable cup or plate. The viscometer's spindle or cone is manually rotated so that the spring exerts its maximum torque value and the viscometer's graduated scale shows a reading of 100. The spindle is then locked in its rotated position. The cone and plate are then assembled and after allowing about 30 seconds for the paint in the plate to equilibrate to a temperature of about 25° C. the spindle is released. The latex paint's relaxation response is obtained by determining the extent of the spindle's rotation over the initial 5 minute interval after releasing the spindle. The difference between 100 and the spindle's reading after the initial 5 minute interval is the percent relaxation response of the latex paint. Semi-gloss latex paints incorporating an emulsion of the present invention prepared with at least one monomer of formula I generally exhibit a relaxation response of at least about a 20 percent drop when measured according to the above procedure. However, if the relaxation response is too great, the paint will exhibit sagging when applied to a vertical surface. Accordingly, the semi-gloss latex paint preferably has a relaxation response of less than about a 70 percent drop. More preferably, these semi-gloss latex paints have a relaxation response of about 20 to about 60 percent drop, and most preferably a relaxation response of about a 30 to about 50 percent drop.

When monomers of formula II are employed in making the emulsion of the present invention, latex paints incorporating these emulsions exhibit an improved film-build. Film-build can be measured using an ICI viscometer. In general, latex paints incorporating emulsions made with monomers of formula II exhibit an ICI viscosity at about 25° C. of at least about 1 poise when measured at about 10,000 sec$^{-1}$. Since a paint's film build is generally directly proportional to its ICI viscosity, latex paints preferably have an ICI viscosity of about 1 to about 2 poise.

EXAMPLES

In these examples, delayed addition and pre-emulsion techniques for preparing emulsions using monomers within the scope of formula I and/or formula II are described. These emulsions are each formulated into a separate latex paint. The film build (ICI viscosity) and flow and leveling (relaxation response) characteristics of each resulting latex paint is compared to a latex paint formulated using an emulsion prepared without any monomer of either formula I or formula II.

EXAMPLES 1-3

Materials

In each of Examples 1-3, a charge and a monomer mixture was prepared having the formulations set forth in the following Table I:

TABLE I

| Ingredients | Examples | | |
|---|---|---|---|
| Charge | 1 | 2 | 3 |
| Water, gm | 260 | 260 | 260 |
| Hydroxyethyl Cellulose, gm | 2 | 2 | 2 |
| Sodium Dihexyl Sulfosuccinate, gm | 0.48 | 0.48 | 0.48 |
| 9 Mole Ethoxylated Nonyl Phenol, gm | 2.3 | 2.3 | 2.3 |
| 30 Moles Ethoxylated Nonyl Phenol, gm | 23.2 | 23.2 | 23.2 |
| Acrylamide, gm | 2 | — | — |
| Monomer Mixture | | | |
| Vinyl Acetate, gm | 320 | 340 | 320 |
| Butyl Acrylate, gm | 80 | 60 | 80 |
| t-Butyl Hydroperoxide, gm | 0.4 | 0.4 | 0.4 |
| m-Isopropenyl-alpha, alpha-dimethylbenzyl isocyanate (m-TMI), gm | 1.6 | — | — |
| 50 Mole Polyethoxylated Nonyl Phenol/m-TMI Adduct (TMIX), gm | — | 10 | — |
| Total Solids, wt. % | 56.2 | 55.5 | 55.0 |

Procedure

The following procedure was used in each of Examples 1-2. A charge of compositions identified in Table I above was added to a reactor. The charged reactor was purged with nitrogen to remove substantially all traces of oxygen from the reactor. After purging the reactor, about 5 weight percent of the monomer mixture was combined at room temperature with the charge in the reactor. Next, the reactor was heated and, when the reactor reached about 130° F., sodium sulfoxylate formaldehyde (about 0.1 gm), potassium persulfate (about 0.1 gm), and a trace amount of ferrous sulfate were added to the reactor. Heating was continued. At about 152° F., there was added the remaining monomer mixture as well as a solution of about 0.6 gm potassium persulfate in about 30 gm water and a solution of about 0.6 gm sodium sulfoxylate formaldehyde in about 30 gm water. These additions took place over the next 2.5 hour period. After completing these additions, an additional initiator and an additional activator were added to the reactor to insure reactor completion. Each of the resulting emulsions had a total solid content as set forth in Table I, above. A similar procedure was used to prepare the emulsion of Example 3. The emulsion of Example 1 contained a monomer (TMI) within the scope of formula I, supra, the emulsion of Example 2 contained a monomer (TMIX) within the scope of formula II, supra, and the emulsion of Example 3 contained neither and is used in Table III, infra, as the control.

EXAMPLES 4-6

Preparation Of Emulsions Using Pre-Emulsion Technique

Materials

In each of Examples 4-6, a charge and a pre-emulsion was prepared having the formulations set forth in the following Table II.

TABLE II

| Ingredients | Examples | | |
|---|---|---|---|
| Charge | 4 | 5 | 6 |
| Water, gm | 130 | 130 | 130 |
| Hydroxyethyl Cellulose, gm | 2 | 2 | 2 |
| 9 Mole Ethoxylated Nonyl Phenol, gm | 2.3 | 2.3 | 2.3 |
| Pre-Emulsion | | | |
| Water, gm | 130 | 130 | 130 |
| 30 Mole Ethoxylated Nonyl Phenol, gm | 23.2 | 23.2 | 23.2 |
| Sodium Lauryl Sulfate, gm | 1.3 | 1.3 | 1.3 |
| Vinyl Acetate, gm | 320 | 320 | 320 |
| Butyl Acrylate, gm | 80 | 80 | 80 |
| t-Butyl Hydroperoxide, gm | 0.4 | 0.4 | 0.4 |
| m-TMI, gm | 1.6 | — | 0.8 |
| TMIX, gm | — | 10 | 3 |
| Total Solids, wt. % | 54.6 | 54.4 | 55.5 |

Procedure

The following procedure was used in each of Examples 4-6. A charge of the composition identified in Table II above was added to a reactor. The charged reactor was purged with nitrogen to remove substantially all traces of oxygen from the reactor. After purging the reactor, about 10 weight percent in the pre-emulsion mixture was combined at room temperature with the charge in the reactor. Next, the reactor was heated and, when the reactor reached about 130° F., sodium sulfoxylate formaldehyde (about 0.1 gm), potassium persulfate (about 0.1 gm), and a trace amount of ferrous sulfate were added to the reactor. Heating was continued. At about 152° F., there was added the remaining pre-emulsion as well as a solution of about 0.6 gm potassium persulfate in about 30 gm water and a solution of 0.6 gm sodium sulfoxylate formaldehyde in about 30 gm water. These additions took place over the next 2.5 hour period. After completing these additions, an additional initiator and an additional activator were added to the reactor to ensure reaction completion. Each of the resulting emulsions had a total solid content as set forth in Table II, above. The emulsion of Example 4 contained a monomer within the scope of formula I, supra, the emulsion of Example 5 contained a monomer within the scope of formula II, supra, and the emulsion of Example 6 contained both.

EXAMPLES 7-12

Film Build and Flow And Leveling Determinations

Each of the emulsions of Examples 1-6 was formulated into a 24 pigment volume concentration (pvc) semi-gloss latex paint. The flow and leveling characteristics of each formulated latex paint were determined by measuring each paint's relaxation response using a Wells-Brookfield Cone-Plate viscometer in accordance with the above-described methodology. The film build of each formulated latex paint was determined by measuring each paint's ICI viscosity using an ICI viscometer. The results of all these tests are set forth in the following Table III:

TABLE III

| Latex Paint Containing Emulsion of Example | Emulsion Used In Latex Paint Made Using Monomer of Formula | Relaxation Response, % Drop Over Initial 5 Min. Interval | ICI Viscosity, Poise |
|---|---|---|---|
| 3 (Control) | — | 8 | 0.5 |
| 1 | I | 47 | 0.7 |
| 2 | II | 11 | 1.4 |
| 4 | I | 42 | 0.6 |
| 5 | II | 8 | 1.5 |
| 6 | I and II | 35 | 1.1 |

The data set forth in the above Table III indicate that latex paints incorporating an emulsion prepared with a monomer within the scope of formula I enhance the paint's flow and leveling characteristics, while latex paints incorporating an emulsion prepared with a monomer within the scope of formula II enhance the paint's film build characteristics. In addition, the data of Table III (Example 6) also indicate that both the flow and leveling characteristics and the film build characteristics of a latex paint can be improved by formulating the latex paint using an emulsion prepared with a monomer within the scope of formula I and a monomer within the scope of formula II. Since these accomplishments can be achieved without the use of a separate rheology modifier, the instant invention provides an excellent approach to enhancing a latex paint's flow and leveling and film build characteristics while avoiding potential problems encountered with the use of separate rheology modifiers.

Although the present invention has been described in considerable detail with reference to certain preferred versions thereof, other versions are possible. Therefore, the spirit and scope of the appended claims should not necessarily be limited to the description of the preferred versions contained herein.

What is claimed is:
1. A latex paint comprising:
   (a) a coalescing aid;
   (b) a thickening aid;
   (c) a dispersing aid;
   (d) a defoamer;
   (e) a biocide;
   (f) a pigment; and
   (g) an emulsion comprising:
      (i) water; and
      (ii) a substantially water insoluble, polymeric binder, the binder comprising at least one pendant group having the formula

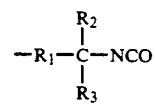

wherein
   $R_1$ is a divalent organic radical;
   $R_2$ and $R_3$ are each independently selected from the group consisting of monovalent alkyl radicals containing up to about seven carbon atoms;
   the pendant group comprises about 0.1 to about two weight percent of the binder;
   the latex paint has a solid content; and the polymeric binder comprises 5 to about 25 weight percent of the solid content of the latex paint.

2. The latex paint of claim 1 wherein the polymeric binder comprises about 15 to about 25 weight percent of the solid content of the latex paint.

3. The latex paint of claim 1 wherein the binder further comprises at least one second pendant group having the formula

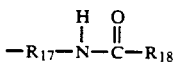

wherein $R_{17}$ is a divalent organic radical; and $R_{18}$ is a monovalent organic radical having an HLB value of about 17 to about 19.

4. A latex paint comprising:

(a) a coalescing aid;
(b) a thickening aid;
(c) a dispersing aid;
(d) a defoamer;
(e) a biocide;
(f) a pigment; and
(g) an emulsion comprising:
   (i) water; and
   (ii) a substantially water insoluble, polymeric binder, the binder comprising at least one pendant group having the formula

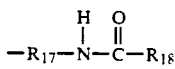

wherein $R_{17}$ is a divalent organic radical;

$R_{18}$ is a monovalent organic radical having an HLB value of about 17 to about 19;

the latex paint has a solid content; and the polymeric binder comprises 5 to about 25 weight percent of the solid content of the latex paint.

5. The latex paint of claim 4 wherein the pendant group comprises about 0.5 to about five weight percent of the binder.

6. The latex paint of claim 1 wherein the emulsion is the product of a reaction mixture comprising at least one monomer having the formula I

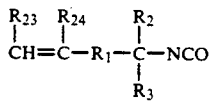

$R_{23}$ being selected from the group consisting of hydrogen and alkyl groups containing up to about 5 carbon atoms and $R_{24}$ being selected from the group consisting of hydrogen, halogen, and alkyl groups containing up to about 5 carbon atoms.

7. The latex paint of claim 6 wherein the reaction mixture further comprises at least one monomer having the formula II

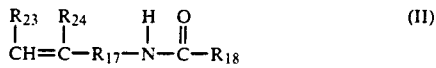

wherein $R_{17}$ is a divalent organic radical;

$R_{18}$ is a monovalent organic radical having an HLB value of about 17 to about 19;

$R_{23}$ is selected from the group consisting of hydrogen and alkyl groups containing up to about 5 carbon atoms; and $R_{24}$ selected from the group consisting of hydrogen, halogen, and alkyl groups containing up to about 5 carbon atoms.

8. The latex paint of claim 7 wherein the monomer of formula II comprises about 1 to about 4 weight percent of the solid content of the emulsion.

9. The latex paint of claim 4 wherein the emulsion is the product of a reaction mixture comprising at least one monomer having the formula II

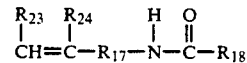

$R_{23}$ being selected from the group consisting of hydrogen and alkyl groups containing up to about 5 carbon atoms and $R_{24}$ being selected from the group consisting of hydrogen, halogen, and alkyl groups containing up to about 5 carbon atoms.

10. The latex paint of claim 9 wherein the monomer of formula II comprises about 0.5 to about five weight percent of the solid content of the emulsion.

11. The latex paint of claim 1 sustantially devoid of a separate rheology modifier.

12. The latex paint of claim 4 sustantially devoid of a separate rheology modifier.

13. The latex paint of claim 1 wherein the binder consists essentially of the pendant group and at least one additional polymerized monomer selected from the group consisting of alkyl esters of acrylic, alpha-haloacrylic, and methacrylic acids; vinyl esters of saturated carboxylic acids; alkenyl aromatics; alkadienes; and reactive monomers.

14. The latex paint of claim 4 wherein the binder consists essentially of the pendant group and at least one additional polymerized monomer selected from the group consisting of alkyl esters of acrylic, alpha-haloacrylic, and methacrylic acids; vinyl esters of saturated carboxylic acids; alkenyl aromatics; alkadienes; and reactive monomers.

15. The latex paint of claim 4 wherein the polymeric binder comprises about 15 to about 25 weight percent of the solid content of the latex paint.

* * * * *